United States Patent [19]

O'Hara

[11] Patent Number: 5,188,457
[45] Date of Patent: Feb. 23, 1993

[54] MEASUREMENT OF THE MAXIMUM TEMPERATURE ATTAINED BY AN ARTICLE

[75] Inventor: Kevin S. O'Hara, Boxford, Mass.

[73] Assignee: General Electric Company, Cincinnati, Ohio

[21] Appl. No.: 849,724

[22] Filed: Mar. 11, 1992

[51] Int. Cl.$^5$ ............................................. G01K 11/00
[52] U.S. Cl. .................................... 374/104; 374/159; 374/102; 374/144
[58] Field of Search ................ 374/102, 104, 159, 144

[56] References Cited

U.S. PATENT DOCUMENTS

| | | | |
|---|---|---|---|
| 3,415,122 | 12/1968 | Yee | 374/104 |
| 3,483,748 | 12/1969 | Rogen et al. | 374/159 |
| 3,839,898 | 10/1974 | Talboom, Jr. et al. | 374/102 |

FOREIGN PATENT DOCUMENTS

| | | | |
|---|---|---|---|
| 2919625 | 11/1979 | Fed. Rep. of Germany | 374/102 |
| 0131084 | 11/1978 | Japan | 374/104 |

Primary Examiner—William A. Cuchlinski, Jr.
Assistant Examiner—Diego F. F. Gutierrez
Attorney, Agent, or Firm—Jerome C. Squillaro; Carmen Santa Maria

[57] ABSTRACT

A method for determining the maximum temperature attained by an article formed of a nickel-based superalloy includes furnishing an article made of a nickel-based superalloy having a gamma/gamma-prime structure at intermediate temperatures and a single phase structure at high temperatures and characterized by a predetermined continuous relation between equilibrium volume fraction of gamma prime phase present and temperature over a transition temperature range. The article is heated with a temperature profile including a maximum temperature within the transition temperature range, and thereafter cooled to ambient temperature to produce a distribution of coarse gamma-prime particles and fine gamma-prime particles in a gamma matrix. The fraction of coarse gamma-prime particles present in the article is measured, and compared with the predetermined continuous relation between equilibrium volume fraction of gamma-prime phase as a function of temperature, to determine a maximum temperature reached by the article. In one useful form, the material having the gamma/gamma-prime structure is provided as a temperature marker that is fixed to the article to be measured, as in the form of a pin or a coating.

18 Claims, 5 Drawing Sheets 0 hrs.

.25 hrs.

3.5 hrs.

40 hrs.

MEASUREMENT OF THE MAXIMUM TEMPERATURE ATTAINED BY AN ARTICLE

BACKGROUND OF THE INVENTION

This invention relates to the determination of the maximum temperature that an article reaches during testing or service, and, more particularly, to a method for making such a determination from the structure of the material.

Many metallic articles are heated to a range of temperatures during use, either intentionally or due to some unforeseen event. In many situations, the maximum temperature reached by the article is of critical concern, while in others the accumulated time at lower temperatures can be of primary interest. The maximum temperature may be the principal determinant of the life of the article, due to phase changes or other phenomena that occur very rapidly after the article reaches that maximum temperature.

One important materials application where maximum temperature is a key concern is the hot section components of aircraft gas turbine (jet) engines. In an aircraft gas turbine engine, air is drawn into the intake of the engine and compressed. Fuel is added to the compressed air, and the mixture is burned to produce exhaust gas. The exhaust gas passes through the hot section of the engine, which includes turbine vanes that bend the gas flow direction slightly and turbine blades mounted on a rotatable disk. The impact of the exhaust gas flow against the turbine blades causes the turbine disk to rotate, which causes a shaft to rotate. The shaft runs up the center of the engine to the compressor, and provides the driving force for operating the compressor.

The turbine vanes, turbine blades, and other hot-section component are desirably made from a nickel-based superalloy. Such materials have maximum operating temperatures of about 2000°-2250° F., depending upon the composition of the metal and the manner in which it is used. A critical concern is the maximum temperature reached by the hot-section component during either testing or service, because of temperature-dependent phase changes and high-temperature failure mechanisms. Brief excursions to elevated temperature often occur in an engine during an emergency-power situation. Those who design and build the engines must know the temperature reached to within a few degrees accuracy so that they can evaluate the effect of the temperature excursion on engine life and performance.

There have been many approaches to the measurement of the maximum temperature reached in the hot sections of the gas turbine engine. Thermocouples, infrared sensors, and other types of temperature measurement devices have been utilized. Such sensors may be operable for the stationary components of the engine, such as the turbine vanes, but lack durability and versatility for the rotating components such as the turbine blades that rotate at rates of 30,000 revolutions per minute or more.

As an alternative temperature-measurement approach, particularly for the rotating components, various metallurgical techniques have been used to estimate the temperature reached by the article. For example, coatings are sometimes applied to the turbine blades to protect them in the hot exhaust gas stream. The degree of wrinkling, melting, or interdiffusion of the coating with the substrate may be used to estimate the maximum temperature reached. Another approach involves measuring alloy, carbide, or subcoating sigma phase dissolution as an indicator. Sigma phase is a deleterious, brittle phase which adversely affects creep/rupture strength. Each of these techniques has drawbacks In most instances, the technique measures not the maximum temperature reached, but some integrated function of time and temperature experienced by the article. In other instances, the technique is completely inoperable for some reason, such as the absence of a phase entirely. No reliable technique for measuring the maximum temperature reached by the article is available.

There is therefore a need for a technique for determining the maximum temperature reached by an article, such as a nickel-based superalloy article used in the hot section of an aircraft gas turbine engine. The technique must be reasonably accurate, and operable for rotating components. The present invention fulfills this need, and further provides related advantages.

SUMMARY OF THE INVENTION

The present invention provides a metallurgical technique for determining the maximum temperature reached by an article. The method is operable for rotating components as well as stationary components, and can be used selectively to register the maximum temperature achieved over a broad range. The method is operable for temperature profiles that include some lower-temperature operation after the maximum temperature is reached, and is accurate to within about $+/-5°$ F. in the appropriate temperature range of the alloy utilized.

In accordance with the invention, a method for determining the maximum temperature attained by an article comprises the steps of furnishing an article made of a material that undergoes a transition from a two-phase, particle plus matrix, structure to a single phase structure with increasing temperature in a transition temperature range characteristic of the material, heating the article with a temperature profile including a maximum temperature within the transition temperature range, and cooling the article to ambient temperature to produce a distribution of coarse particles and fine particles in a matrix. After cooling, the fraction of coarse particles present in the article is measured. That fraction is compared with a predetermined calibration plot of equilibrium fraction of particles as a function of temperature, to determine a maximum temperature reached by the article. Accuracy is achieved by utilizing proper statistical sampling.

It is sometimes the case that the maximum temperature that might be reached during service or testing is not within the transition temperature range of the article itself. In this case, another material can be used as a temperature marker or indicator. In accordance with this aspect of the invention, a method for determining the maximum temperature attained by an article comprises the steps of furnishing an article, and furnishing a temperature marker made of a marker material that undergoes a transition from a two-phase, particle plus matrix, structure to a single phase structure with increasing temperature in a transition temperature range characteristic of the marker material. The article and the temperature marker are together heated with a temperature profile including a maximum temperature within the transition temperature range of the marker material, and cooled to ambient temperature to produce a distribution of coarse particles and fine particles in a matrix. The fraction of the coarse particles present in the temperature marker is measured and compared with a predetermined calibration plot of equilibrium fraction of particles as a function of temperature for the marker, to determine a maximum temperature reached by the temperature marker and the article.

In a preferred embodiment, the present invention is implemented using the gamma-prime solutioning behavior of nickel-based superalloys. At intermediate temperatures, the equilibrium microstructure of these materials is a two-phase mixture of ordered gamma-prime particles in a gamma phase matrix. As such a mixture is heated to higher temperatures, the gamma-prime phase dissolves into the gamma phase.

The equilibrium fraction of gamma-prime phase present is a function of temperature, the fraction of gamma-prima phase becoming smaller at higher temperatures. The relationship between fraction of gamma-prime phase present and temperature has been determined accurately for several nickel-based superalloys of interest, and can be determined for others by a straightforward calibration procedure.

When an article such as a turbine blade is heated to some maximum temperature during a temperature profile, the fraction of gamma-prime phase reaches the equilibrium amount in a short time, typically less than two minutes. The equilibrium gamma-prime phase then coarsens at a rate depending upon time, temperature, and applied stress. Gamma-prime phase sizes larger than 4.0 micrometers are common. The coarsening desirably should be allowed to reach a convenient dimension to aid measurement. Upon cooling to lower temperatures, additional gamma-prime phase forms quite rapidly, as well. If all of the gamma-prime phase were later counted in an attempt to determine the maximum temperature reached, the result would be erroneous and would suggest some lower exposure temperature. However, the gamma-prime phase that forms during subsequent cooling is, in large part, present as fine, generally equiaxed precipitates of a size of about 0.2 micrometers or less. The coarse particles are readily distinguished from the fine particles in the microscope, by those skilled in the art. If only the fraction of coarse precipitate is measured and used in the determination of maximum temperature, the result reflects the equilibrium reached at the maximum temperature rather than the prior or subsequent events. While some error may be present due to coarsening phenomena that cause the fine particles near the coarse particles to dissolve and reprecipitate on the coarse particles, these effects are small unless the article is maintained at the lower temperature for some extended period of time.

If the maximum temperature is not within the gamma-prime dissolution temperature range of the alloy from which the article is formed, temperature markers of other alloys having gamma-prime phase dissolution within the desired temperature range are provided. For example, if as often happens the maximum expected temperature is lower than the dissolution temperature range of the alloy of the article, a temperature marker of an alloy having a lower dissolution temperature range is provided Several different temperature markers can be used, so that a wide range of possible maximum temperatures can be recorded. The temperature marker is usually fixed to the article to ensure good thermal contact, and can be of any suitable form such as a pin or a coating.

The present invention provides an important advance in the art. It can be implemented with a variety of alloys, and does not interfere with the operation of the machinery with which it is used. Testing has shown that the approach of the invention is quite accurate for many testing and service conditions actually encountered in practice. Other features and advantages of the invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENTS

The approach of the invention is preferably used in conjunction with a hot-section component of a jet engine, such as an illustrated gas turbine blade 10 or a gas turbine vane. The turbine blade includes an airfoil section 12 against which hot combustion gases are directed when the engine operates. The airfoil section 12 is anchored to a turbine disk (not shown) through a dovetail or root section 14. In some cases, cooling passages 16 are present in the airfoil section 12, through which cool bleed air is forced to remove heat from the turbine blade 10. The turbine blade or vane is normally prepared by a casting and solidification procedure well known to those skilled in the art, such as investment casting, directional solidification, or single crystal growth.

In accordance with one preferred embodiment, a method for determining the maximum temperature attained by an article formed of a nickel-based superalloy comprises the steps of furnishing an article made of a nickel-based superalloy having at least a two-phase gamma/gamma-prime structure at intermediate temperatures and a single phase gamma structure at high temperatures and characterized by a predetermined continuous relation between equilibrium volume fraction of gamma prime phase and temperature over a transition temperature range. The article is heated with a temperature profile including a maximum temperature within the transition temperature range, and cooled to ambient temperature to produce a distribution of coarse gamma-prime particles and fine gamma-prime particles in a gamma matrix. The fraction of coarse gamma-prime particles present in the article is measured and compared with the predetermined continuous relation between equilibrium volume fraction of gamma-prime phase as a function of temperature, to determine a maximum temperature reached by the article. The amount of coarse gamma-prime particles present is measured by any acceptable quantitative metallographic technique, such as the point count or line count methods.

Figure 1:
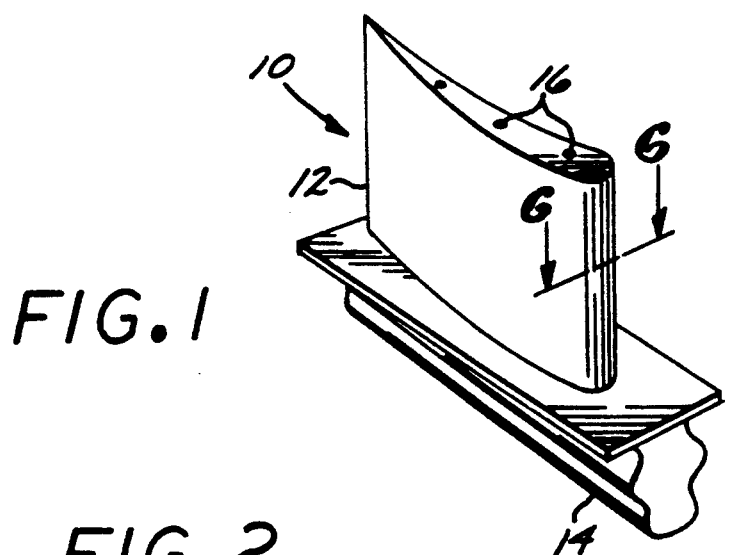
FIG. 1 is a perspective view of a gas turbine blade.
Figure 2:
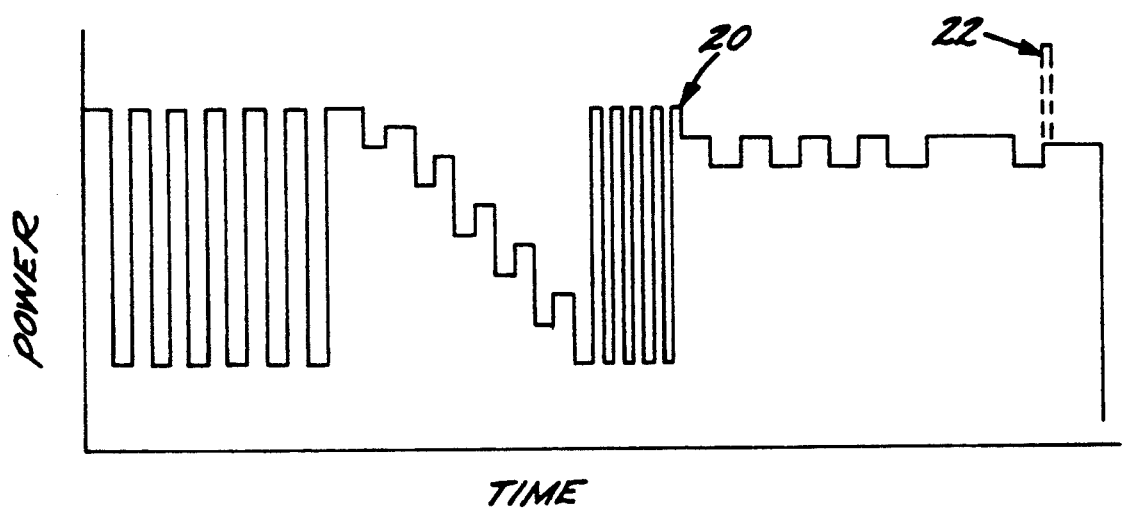
FIG. 2 is an example of a power profile of a gas turbine engine during a test cycle.

FIG. 2 illustrates the power level as a function of time for a typical simulated gas turbine engine test cycle. The power applied to the engine is varied through a range of power levels, as illustrated. The temperature of the turbine blade 10 generally increases with increasing power levels, and the present invention permits a direct correlation to be made between maximum power level and maximum turbine blade temperature, by providing a determination of the actual maximum temperature reached by the turbine blade. As shown in FIG. 2, there may be a normal maximum operating power, indicated at numeral 20, or an even higher emergency or contingency maximum power level, indicated at numeral 22.

Figure 3:
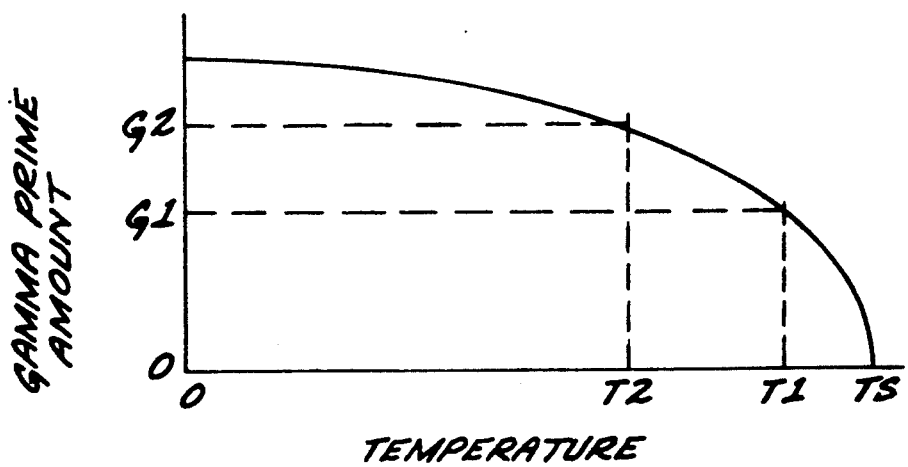
FIG. 3 is a schematic graph of the equilibrium fraction of gamma-prime phase as a function of temperature.

FIG. 3 illustrates the basis for the measurement approach. At intermediate temperatures, the microstructure of the nickel-based superalloy used in the turbine blade 10 is coarse gamma-prime particles dispersed in a gamma matrix. If the material is held at a temperature $T_2$ for a sufficiently long time to permit equilibration, the amount or volume fraction of gamma-prime particles is indicated in FIG. 3 as $G_2$. If the temperature is increased to $T_1$, the amount or volume fraction of gamma-prime particles decreases to $G_1$, as the alloying constituents that contribute to the formation of the gamma-prime particles dissolve into the gamma matrix. Within the temperature range of gamma-prime solutioning, equilibration upon heating occurs quickly, in about two minutes or less. If the temperature is raised above a solutioning temperature $T_s$, all of the gamma-prime particles dissolve, so that the amount of gamma-prime particles is zero. However, under the present approach all measuring procedures are preferably conducted at temperatures below $T_s$.

Figure 4A:
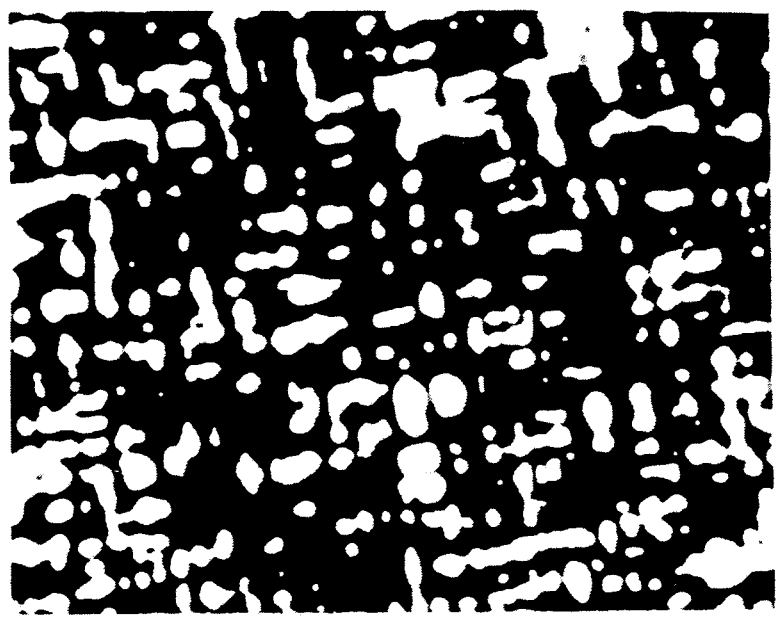
FIG. 4 is a set of micrographs of the structure of Rene 108 alloy after exposure at a maximum temperature of 2150° F. and subsequent reduction of temperature to 2090° F. and a holding period of (A) 0 hours, (B) 0.25 hours, (C) 3.5 hours, and (D) 40 hours.
Figure 4B:
Figure 4C:
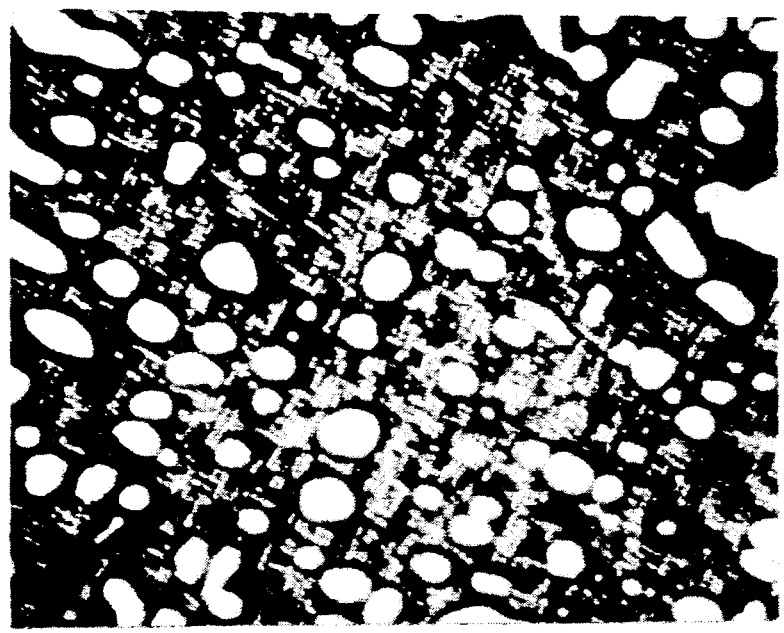
Figure 4D:
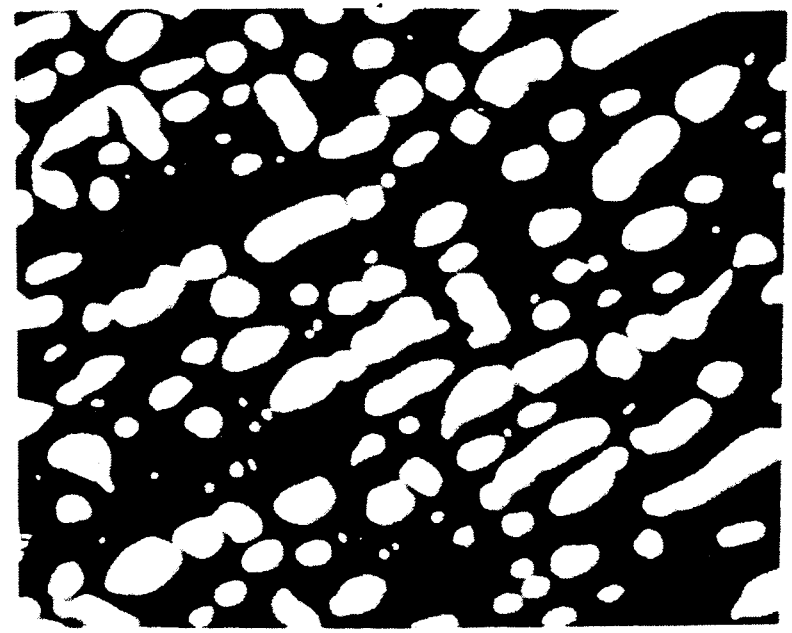

When the material is cooled, the reverse reactions do not occur so readily. If the material is held to obtain equilibration at $T_1$, a structure of coarse gamma-prime particles in a gamma matrix is produced. As can be seen in the example of FIG. 4, the coarse gamma-prime particles range are about 5 micrometers in size. If the material is then cooled to $T_2$ and held for an appropriate time, initially the microstructure is substantially the same as at $T_1$, as shown in FIG. 4(A). After a short period of time, as shown in FIG. 4(B), new fine gamma-prime particles form in the gamma matrix. However, the new gamma-prime particles are seen to be much smaller than the coarse array and distributed between the coarse gamma-prime particles. After a period of time at temperature $T_2$, the fine gamma-prime particles near the coarse gamma-prime particles dissolve and begin to redeposit on the coarse gamma-prime particles, as shown in FIG. 4(C). After very long times at temperature $T_2$, the fine gamma-prime particles all dissolve and redeposit upon the coarse gamma-prime particles, FIG. 4(D).

If the amount or volume fraction of the coarse particles is statistically measured after a relatively short exposure at reduced temperature, in the range between FIGS. 4(A) and 4(C), that volume fraction will reflect the equilibrium amount $G_1$ at the maximum temperature $T_1$. The sluggish reprecipitation and growth kinetics upon cooling allow retention of a "fingerprint" of the maximum temperature in the form of the volume fraction of coarse gamma-prime particles in the structure upon cooling. Studies have shown that the fingerprint is retained for up to about 2 hours of continued operation after the maximum temperature is experienced. Of course, the shorter the amount of additional exposure at reduced elevated or intermediate temperatures after the maximum temperature is experienced, the greater will be the accuracy.

Thus, to practice the present approach, the structure of the article to be evaluated is preferably stabilized at some intermediate temperature, and then heated isothermally or subjected to thermal cycling as shown in FIG. 2. The component is then cooled to ambient temperature, sectioned, and examined metallographically. The volume fraction of coarse gamma-prime particles is measured by any convenient technique. That volume fraction is correlated with a temperature using the graph of FIG. 3, and the selected temperature is judged to be the maximum temperature reached by the component.

Figure 5:
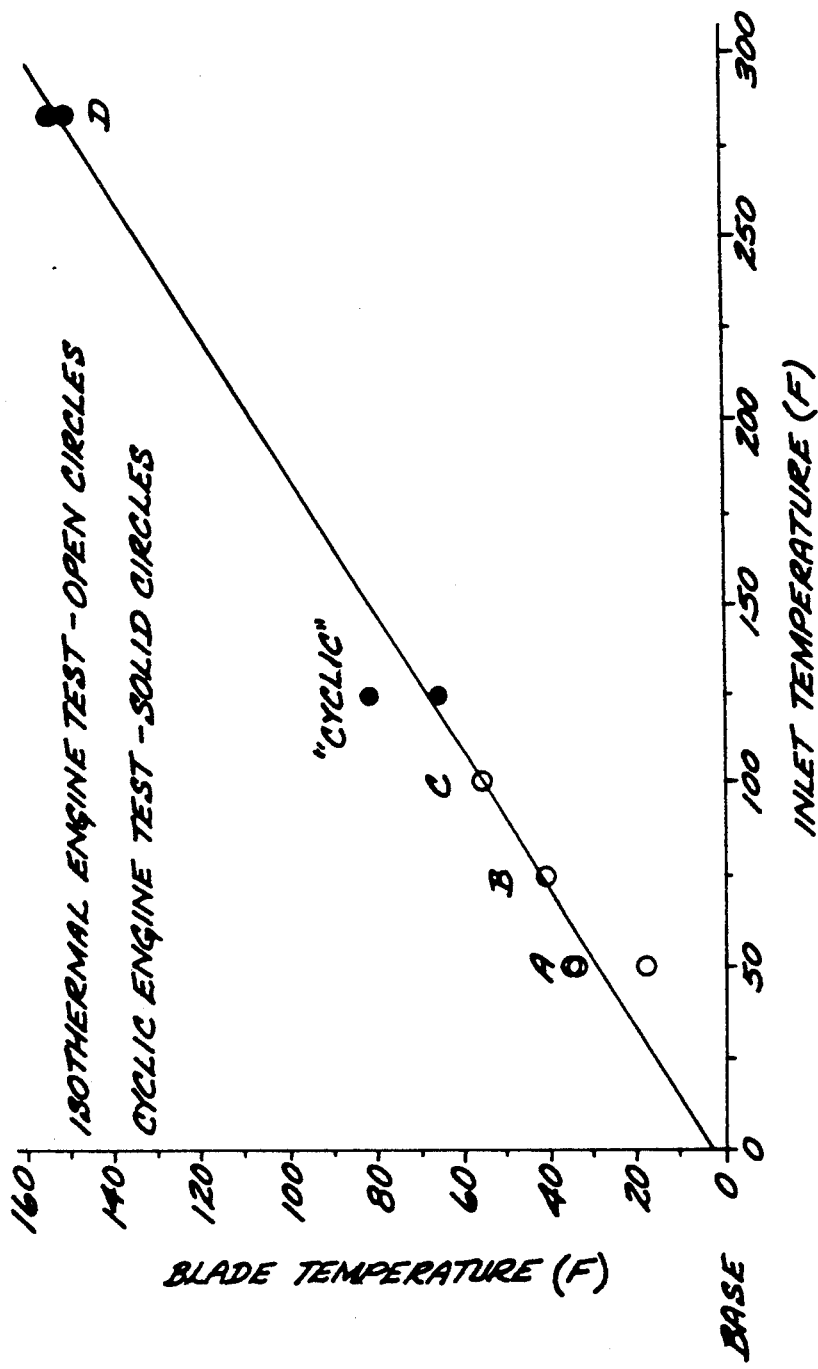
FIG. 5 is a graph of measured turbine blade temperature as a function of turbine inlet temperature increase over a baseline condition in actual gas turbine engine testing.

FIG. 5 illustrates the results of an actual engine test in which the engine power level was varied to a maximum level and held isothermally or cycled between the maximum level and lower levels. The temperatures of several Rene 108 gas turbine blade were determined by the method just discussed. The gas turbine inlet temperature was measured by a thermocouple. The variation of each quantity above a reference value is plotted in FIG. 5. The results of multiple tests at four isothermal engine power level variations and one cyclic engine power level variation are illustrated. A good linear correlation between the turbine blade temperature and the turbine inlet temperature is found. This information can then be used in assessing the temperature-related damage to the turbine blade and evaluating the effect of various power level variations.

The approach just described works well when the maximum temperatures experienced by the turbine blade or other component happen to fall within the upper range of the gamma-prime solubility curve for that alloy, as indicated in FIG. 3. When that is not the case, another alloy can be used as a temperature marker. In accordance with this aspect of the invention, a method for determining the maximum temperature attained by an article comprises the steps of furnishing an article and furnishing a temperature marker made of a marker material nickel-based superalloy having a gamma/gamma-prime structure at intermediate temperatures and a single phase structure at high temperatures and characterized by a predetermined continuous relation between equilibrium volume fraction of gamma prime phase present and temperature over a transition temperature range. The article and the temperature marker are heated together with a temperature profile including a maximum temperature within the transition temperature range, and cooled to a temperature below the transition temperature, preferably ambient temperature, to produce a distribution of coarse gamma-prime particles and fine gamma-prime particles in a gamma matrix. The fraction of coarse gamma-prime particles present in the temperature marker is measured and compared with the predetermined continuous relation between equilibrium volume fraction of gamma-prime phase as a function of temperature for the temperature marker, to determine a maximum temperature reached by the article.

Figure 6:
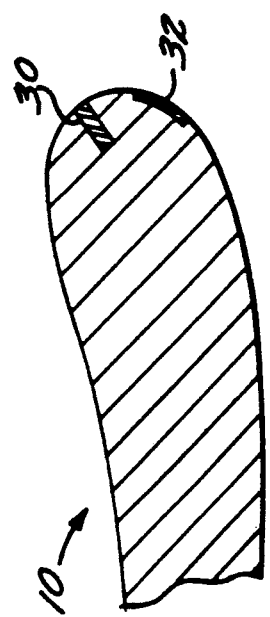
FIG. 6 is an enlarged sectional view of the gas turbine blade of FIG. 1, taken generally along line 6—6, illustrating the placement of temperature markers.

FIG. 6 illustrates two forms in which the temperature marker may be used. In one, the temperature marker is made in the form of a pin 30. A hole is formed in the turbine blade 10, and the pin 30 inserted into the hole. The pin 30 is then fixed in place within the hole, as by brazing, and ground flush with the surface of the turbine blade so as not to interfere with the aerodynamics of the turbine blade. In the second illustrated approach, the temperature marker is formed as a coating 32 that is deposited upon the surface of the turbine blade 10.

In either configuration, or in any other convenient form of the temperature marker that may be assembled to the component for a particular application, the component is then tested or operated in service. After a period of time, the component is cooled to ambient temperature, and the temperature marker or markers are studied in the same manner as was previously described. In the case of the temperature marker approach, the appropriate gamma-prime solutioning calibration for the alloy of the temperature marker is used. To permit evaluation over wider temperature ranges than those permitted by a single alloy, several different temperature markers may be used on the same component.

Figure 7:
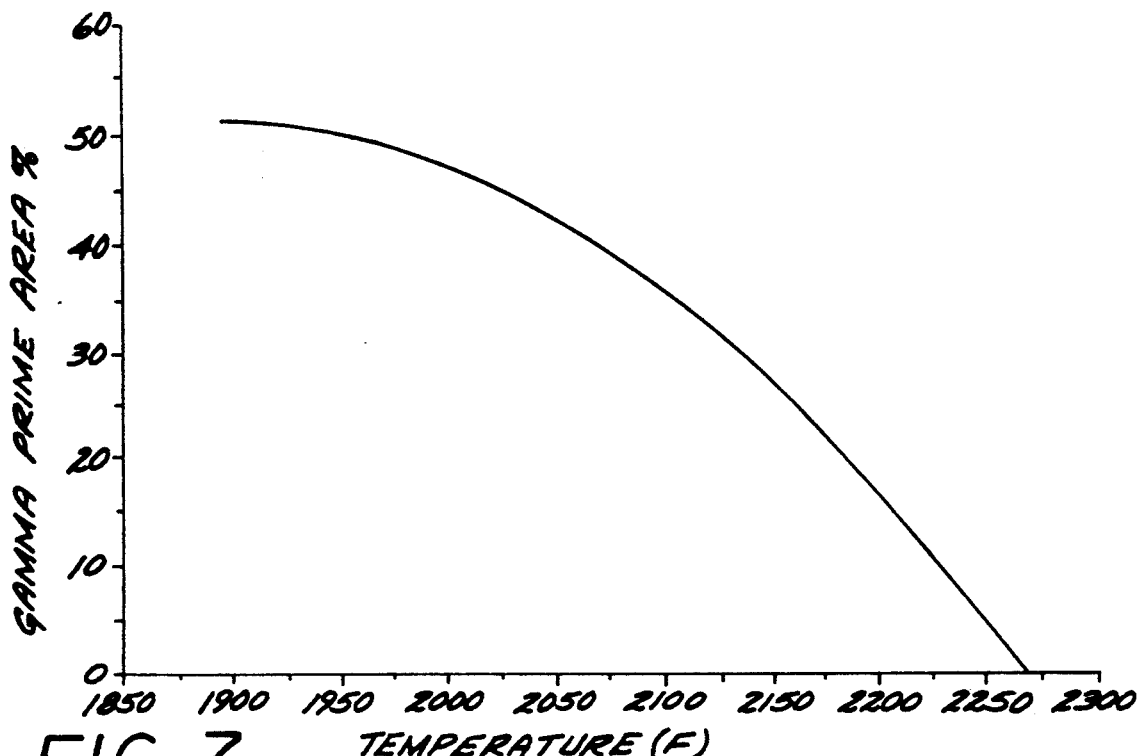
FIG. 7 is a gamma-prime solutioning curve for Rene 108 alloy.
Figure 8:
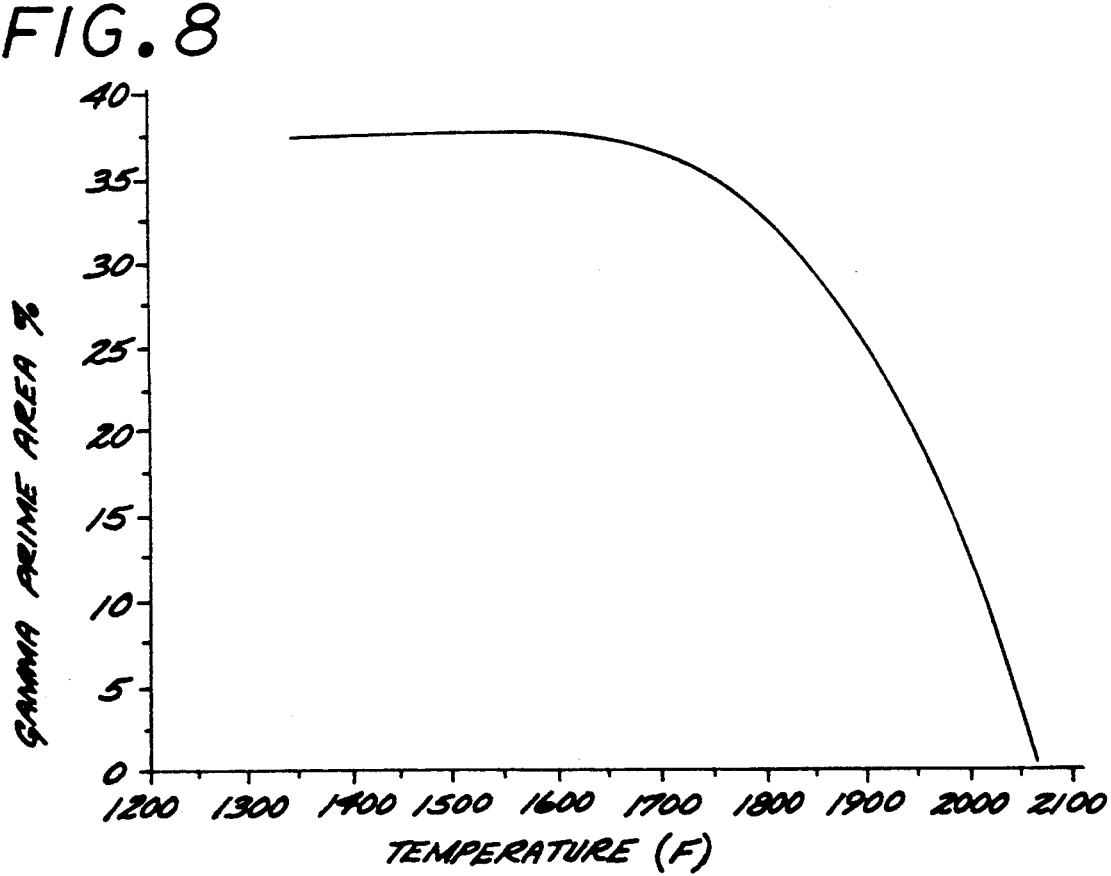
FIG. 8 is a gamma-prime solutioning curve for Rene 77 alloy.

FIGS. 7 and 8 show actual measured gamma-prime solutioning calibration curves for two different gamma/gamma-prime alloys. FIG. 7 is for the alloy Rene 108, which has a nominal composition in weight percent of 8.4 percent chromium, 9.5 percent cobalt, 5.8 percent aluminum, 0.7 percent titanium, 0.5 percent molybdenum, 9.5 percent tungsten, 1.4 percent hafnium, 3.1 percent tantalum, 0.11 percent carbon, 0.015 percent boron, balance nickel. This alloy may be used to practice the invention over a range of about 2025°–2270° F., as the solutioning curve shows a variation from the maximum value to nearly zero in this range. If it is necessary to assess the maximum temperature that a Rene 108 component reaches, where the maximum temperature is expected to be less than about 2070° F., then a temperature marker of Rene 77 may be used. Rene 77 has a nominal composition in weight percent of 14.2 percent chromium, 15.0 percent cobalt, 4.3 percent aluminum, 3.4 percent titanium, 4.2 percent molybdenum, 0.5 percent iron, 0.07 percent carbon, 0.016 percent boron, balance nickel. The gamma-prime solutioning calibration curve for this alloy, FIG. 8, illustrates a range of operability for the present invention of about 1700°–2070° F. Between these two alloys, Rene 108 and Rene 77, maximum temperatures of about 1700°–2270° F. can be determined. A Rene 108 turbine component can be assessed for the maximum temperature achieved over this range by affixing a temperature marker of Rene 77 to the turbine component. Although Rene 108 and Rene 77 are used as examples to span the temperature range from 1700°–2270° F., it will be recognized by those skilled in the art that other gamma/gamma-prime nickel-based alloys may be selected to span the same ranges, or to span narrower or broader ranges, as desired.

Thus, the present approach provides a versatile and accurate technique for assessing the maximum temperature reached by an article. This invention has been described in connection with specific embodiments and examples. However, it will be readily recognized by those skilled in the art the various modifications and variations of which the present invention is capable without departing from its scope as represented by the appended claims.

What is claimed is:

1. A method for determining a maximum temperature attained by an article, comprising the steps of:
    furnishing an article made of a material that undergoes a transition from a two-phase, particle plus matrix structure to a single phase structure with increasing temperature in a transition temperature range characteristic of the material;
    heating the article with a temperature profile including a maximum temperature within the transition temperature range;
    cooling the article to ambient temperature to produce a distribution of coarse particles and fine particles in a matrix;
    measuring the fraction of coarse particles present in the article; and
    comparing the measured fraction of coarse particles with a predetermined calibration plot of the equilibrium fraction of particles as a function of temperature, to determine the maximum temperature reached by the article.

2. The method of claim 1, wherein the article is made of a gamma/gamma prime nickel-based superalloy.

3. The method of claim 1, wherein the article is formed as a gas turbine engine hot-section component.

4. A method for determining a maximum temperature attained by an article, comprising the steps of:
    furnishing an article;
    furnishing a temperature marker made of a marker material that undergoes a transition from a two-phase, particle plus matrix structure to a single phase structure with increasing temperature in a transition temperature range characteristic of the marker material;
    heating the article and the temperature marker with a temperature profile including a maximum temperature within the transition temperature range of the marker material;
    cooling the article and the temperature marker to ambient temperature to produce a distribution of coarse particles and fine particles in a matrix;
    measuring the fraction of coarse particles present in the temperature marker; and
    comparing the measured fraction of coarse particles in the temperature marker with a predetermined calibration plot of the equilibrium fraction of particles as a function of temperature for the marker, to determine the maximum temperature reached by the temperature marker and the article.

5. The method of claim 4, including the additional step, prior to the step of heating, of
    attaching the temperature marker to the article.

6. The method of claim 4, wherein the temperature marker is furnished in the form of a pin, and the method includes the additional step of
    making a hole in the article and inserting the temperature marker pin into the hole.

7. The method of claim 4, wherein the temperature marker is furnished in the form of a coating, and the method includes the additional step of
    applying the temperature marker coating to a surface of the article.

8. The method of claim 4, wherein the temperature marker is made of a gamma/gamma prime nickel-based superalloy.

9. The method of claim 4, wherein the article is formed as a gas turbine engine hot-section component.

10. A method for determining a maximum temperature attained by an article formed of a nickel-based superalloy, comprising the steps of:
furnishing an article made of a nickel-based superalloy having a gamma/gamma-prime structure at intermediate temperatures and a single phase structure at high temperatures and characterized by a predetermined continuous relation between equilibrium volume fraction of gamma prime phase present and temperature over a transition temperature range;
heating the article with a temperature profile including a maximum temperature within the transition temperature range;
cooling the article to below the transition temperature range to produce a distribution of coarse gamma-prime particles and fine gamma-prime particles in a gamma matrix;
measuring the fraction of coarse gamma-prime particles present in the article; and
comparing the measured fraction of coarse gamma-prime particles with a predetermined continuous relation between equilibrium volume fraction of gamma-prime phase as a function of temperature, to determine the maximum temperature reached by the article.

11. The method of claim 10, wherein the article is cooled to ambient temperature in the step of cooling.

12. The method of claim 10, wherein the article is formed as a gas turbine engine hot-section component.

13. A method for determining a maximum temperature attained by an article, comprising the steps of:
furnishing an article;
furnishing a temperature marker made of a marker material nickel-based superalloy having a gamma/gamma-prime structure at intermediate temperatures and a single phase structure a high temperatures and characterized by a predetermined continuous relation between equilibrium volume fraction of gamma prime phase present and temperature over a transition temperature range;
heating the article and the temperature marker with a temperature profile including a maximum temperature within the transition temperature range;
cooling the article and the temperature marker to ambient temperature to produce a distribution of coarse gamma-prime particles and fine gamma-prime particles in a gamma matrix;
measuring the fraction of coarse gamma-prime articles present in the temperature marker; and
comparing the measured fraction of coarse gamma-prime particles in the temperature marker with the predetermined continuous relation between equilibrium volume fraction of gamma prime phase as a function of temperature for the temperature marker, to determine the maximum temperature reached by the article.

14. The method of claim 13, including the additional step, prior to the step of heating, of
fixing the temperature marker to the article.

15. The method of claim 13, wherein the temperature marker is furnished in the form of a pin, and the method includes the additional step of
making a hole in the article and inserting the temperature marker pin into the hole.

16. The method of claim 13, wherein the temperature marker is furnished in the form of a coating, and the method includes the additional step of
applying the temperature marker coating to the surface of the article.

17. The method of claim 13, wherein the article is formed as a gas turbine engine hot-section component.

18. The method of claim 17, wherein the hot-section component comprises an airfoil.

* * * * *